3,350,297
STAGED CENTRIFUGATION OF WAX FROM A COUNTERCURRENT EXTRACTION PROCESS

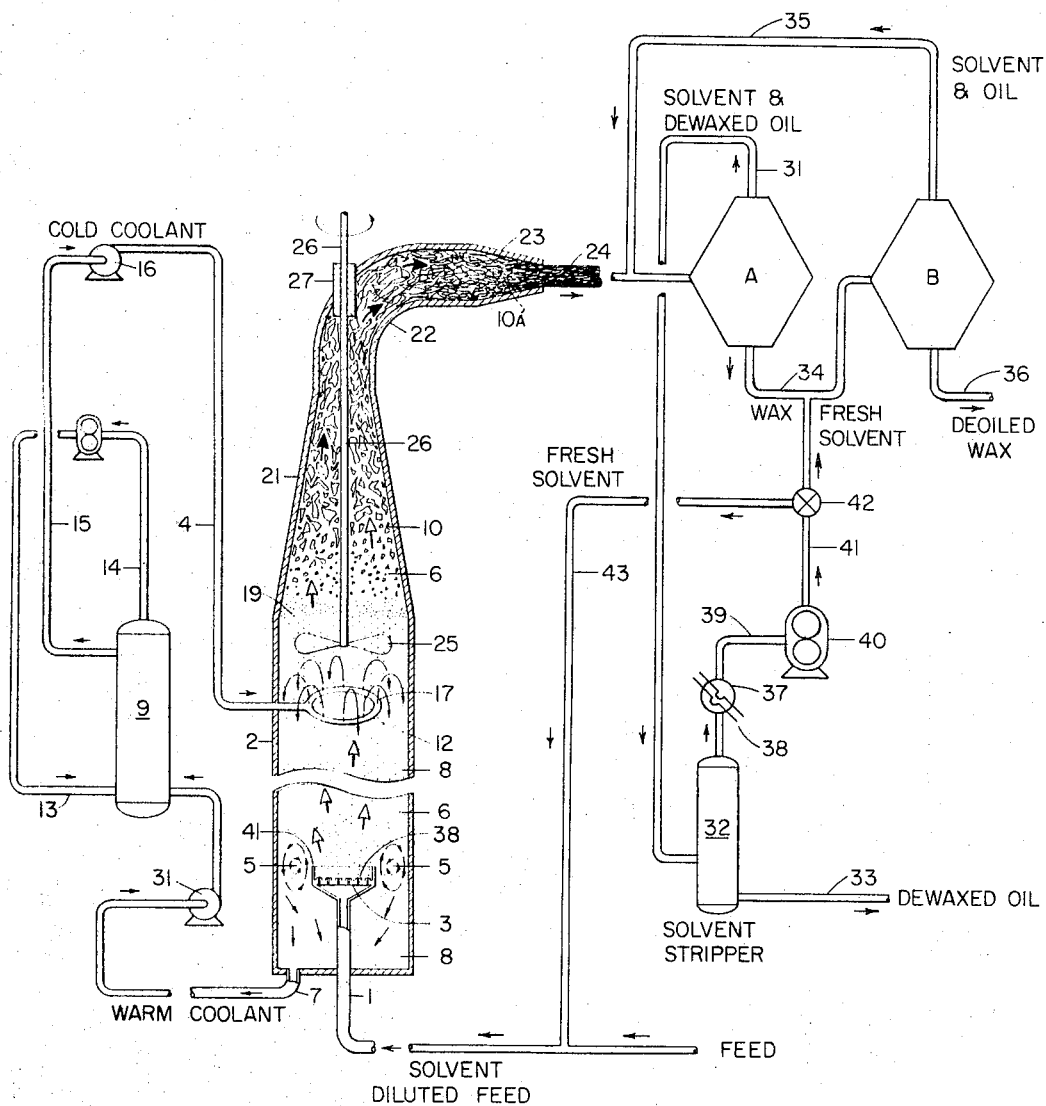

Leonard B. Torobin, Essex County, N.J., assignor to Esso Research and Engineering Company, a corporation of Delaware
Filed Mar. 11, 1964, Ser. No. 350,958
7 Claims. (Cl. 208—37)

This application is a continuation-in-part of U.S. application based on U.S. Serial No. 350,957 filed on Mar. 11, 1964, now U.S. Patent 3,294,672.

This invention relates to a process for dewaxing a wax-containing hydrocarbon feed by cooling the feed to a temperature at which said wax crystallizes from the feed, and separating the crystallized wax from the dewaxed feed. The hydrocarbon feed containing the crystallizable wax in solution is introduced into a cooling tower as a dispersed phase of essentially uniform size droplets and contacted countercurrently with a continuous phase immiscible coolant whereby the feed is cooled to the crystallization temperature of the wax and wax is crystallized from solution within each of the feed droplets.

The invention particularly relates to a direct immiscible cooling crystallization dewaxing process wherein minimum solvent is added to the feed to the crystallization step and where the wax in the wax feed slurry recovered from the crystallization step is separated from the dewaxed feed in a two-stage centrifugation separation process. The major portion of the fresh solvent added to the process is added to the wax feed slurry fed to the second stage of the separation process.

This invention specifically relates to an improved process for dewaxing oil wherein there is a substantial reduction in the overall solvent required for carrying out the process, which improvement is obtained by using minimum solvent in the crystallization step, separating the crystallized wax from the wax-oil slurry in a two-stage centrifugation separation process and adding the fresh solvent needed to carry out the separation of the wax-oil slurry feed to the second stage.

Various attempts have been made to find a simple, efficient, and economic method for dewaxing hydrocarbon fractions. Efficient operation to date has, in most cases, been limited by the equipment and techniques developed which had either limited efficiency or limited throughput of hydrocarbon feed. A major problem encountered was to maintain the flow of the suspension of crystallized wax in oil slurry in the chilling apparatus at the low temperatures required to carry out the wax crystallization step. Another problem was the inability to handle the slurry at crystallization temperatures below the pour point of the slurry.

In conventional dewaxing processes, it has been necessary to use relatively high ratios of solvent relative to the amount of waxy-oil feed being dewaxed. The need for using large volumes of solvent substantially increases the cost of carrying out the dewaxing process by increasing the overall solvent inventory needs, increasing the size of the equipment needed to handle the larger volume of feed plus solvent, increasing pumping costs and compressor capacity and increasing refrigeration needed to cool the larger volume of feed plus solvent.

Conventional dewaxing required high solvent dilution ratios in the wax crystallization step to allow mobility of the wax-oil slurry at final crystallization temperatures below the normal pour point of the wax-oil slurry. Otherwise, the slurry would harden and plug the equipment. In the separation of the crystallized wax from the wax-oil slurry, particularly where the separation is by centrifugation, high solvent dilution ratios were required to facilitate the passage of the wax crystals through the dewaxed oil. This is because the dewaxed oil at the separation temperatures used is frequently so viscous that it inhibits the movement of the wax crystals through the dewaxed oil. The addition of solvent dilutes the dewaxed oil and reduces the density of the oil and increases the density difference between the oil and wax crystals thereby aiding in the separation. The solvent also diffuses in the wax crystalline structure and displaces entrapped oil with solvent thereby allowing better separation of the wax from the oil.

In a process recently described by applicant, hydrocarbon feed containing a crystallizable wax is fed to a treating tower at a temperature above the wax crystallization temperature of the feed and contacted with an immiscible coolant. Feed enters the column either at the top or bottom of the column, depending on whether it is more dense or less dense than the coolant. The feed is introduced into the column as a dispersed spray of essentially uniform size droplets. The coolant is introduced into the opposite end of the column through an inlet means and forms a continuous liquid coolant phase and moves countercurrently to the dispersed droplets. The coolant is introduced into the tower at a temperature below the crystallization temperature of the wax in the feed. By the time the relatively dense bed of droplets reaches the opposite end of the column from which it was introduced, a part of or substantially all of the wax in the oil in the droplets can be crystallized or precipitated out of solution of the oil feed.

This process has overcome the requirement in the prior art processes of maintaining the wax-oil slurry itself in a fluid condition during the crystallization step or in keeping the final crystallization temperature above the pour point of the wax-oil slurry. Because the waxy hydrocarbon feed is introduced as a dispersed phase, the fluidity of the wax-oil slurry needed in the system during the chilling and crystallization step is provided by the continuous phase liquid coolant which is interspaced between each of the oil droplets containing the crystallized wax. The fluidity of the wax-oil slurry during crystallization therefore has no effect on carrying out the crystallization step.

Applicant unexpectedly found that increased feed throughput and increased centrifugation capacity could be obtained by using minimum solvent in the crystallization step in conjunction with staged separation of the crystallized wax from the wax oil slurry and introducing fresh solvent interstage. A substantial reduction in overall solvent inventory requirement and refrigeration needs for a specified oil feed throughput has been realized by utilizing applicant's process.

In accordance with the present invention, a countercurrent contacting tower having a gradual constriction at the end of the tower from which the wax-oil slurry is removed is used. The tower is operated at positive pressure. The wax crystallization step is carried out in the tower by introducing the waxy oil feed into the tower as a relatively dense dispersion of essentially uniform diameter droplets. The droplets are countercurrently contacted with a continuous immiscible coolant phase. The wax crystallization step can be carried out with minimum or no solvent, depending on the particular feed being dewaxed, because the fluidity of the dispersed phase is not dependent upon the pour point of the crystallized wax-oil slurry. The fluidity necessary for movement through the process is provided by the continuous coolant phase interspaced between each dispersed phase feed droplet. In accordance with applicant's process, the final crystallization temperature can be below the pour point of the wax-oil slurry and not adversely affect the crystallization step.

The continuous liquid coolant phase is introduced through a suitable inlet means into the end of the tower opposite the end which the feed is introduced and moves countercurrently to the dispersed feed phase. The coolant is introduced at a temperature below the crystallization temperature of the wax in the feed. The major portion of the coolant is removed from the opposite end of the column from which it is introduced and cooled by suitable means to its inlet temperature and recycled.

In the opposite end of the tower to which the feed was introduced, the dispersed feed phase droplets, each containing crystallized wax and oil, is collapsed and compressed by passage through the gradually constricted withdrawal means to form an essentially continuous zone of wax-oil slurry which forms a pressure seal against which the positive pressure in the tower can act to push the wax-oil slurry out of said tower, and the crystallized wax is separated from the wax-oil slurry by staged centrifugation.

The separation is carried out in two stages. In the first stage, the centrifuge is operated to remove substantially all of the wax from the wax-oil slurry and the overflow contains low pour point dewaxed oil.

The underflow stream from the first stage separation contains substantially all the wax and some carryover oil. This stream is mixed with fresh solvent and fed to the second stage wherein the added solvent displaces entrapped oil and substantially all the oil is separated from the wax. The underflow from this stage contains low oil content wax and some solvent. The solvent is subsequently stripped from the wax. The overflow stream from the second stage separation contains mostly solvent and recovered carryover oil. This solvent stream is recycled and mixed with the wax-oil slurry feed fed to the first stage of centrifugation. In effect, the first stage centrifugation is a dewaxing step and the second stage a deoiling step of the wax recovered from the first stage.

The wax-oil slurry feed fed to the first stage centrifugation can be cooled to its final crystallization temperature by cooling the recycle solvent (e.g., propane) stream (e.g., by adding ethane under pressure and then allowing it to vaporize) to a temperature below the minimum temperature in the tower by mixing the thus cooled cold recycle solvent directly with the wax-oil slurry. This results in a greater increase in efficiency in obtaining the final reduction in temperature because the refrigeration is transferred directly to the slurry rather than first being transferred to the immiscible coolant and then to the slurry. This also results in obtaining lower pour point oils.

Applicant has unexpectedly found that high centrifuge separation rates can be obtained by staging the centrifuges and operating the centrifuges in series. Higher separation rates of wax from oil in the wax-slurry feed can be obtained with a fixed centrifuge capacity at specified oil and wax quality while minimizing the overall solvent dilution ratio requirement by adding the major portion of the solvent used interstage and using a minimum amount of solvent in the crystallization step. Applicant found that it is not the total amount of solvent in the system that is important in obtaining improved separation rates as much as it is where in the process the solvent is added. Applicant found that substantial improvement in separation capacity was obtained by adding the major portion of the solvent interstage to the separation step as compared with adding it to the feed to the crystallization step.

This advantage can be exploited because of applicant's novel crystallization step which can be operated with minimum or no solvent. Also, using minimum solvent in the crystallization step aids in the separation step because crystalline structures which are formed are more easily separated from the oil.

One of the main advantages of the present invention is in allowing crystallization of the wax in the feed using a minimum or no solvent in the crystallization step without plugging the equipment even in situations where the final crystallization temperature is below the pour point of the wax-oil slurry. The mobility of the wax crystal oil suspension is not dependent upon the fluidity of the wax-oil slurry because the coolant is interspaced between each droplet during crystallization and provides the necessary fluidity.

Another advantage of using applicant's process whereby little or no solvent is used in the crystallization step is that there is a substantial reduction in refrigeration required to cool the oil plus hydrocarbon feed down to the wax crystallization temperature. For example, if a solvent-to-feed ratio of 3-to-1 were used, a total of four volumes of feed would have to be cooled to the wax crystallization temperature. This would require approximately two volumes of immiscible coolant to crystallize the wax in the one volume of oil. On the other hand, if a solvent-to-feed ratio of 0.5-to-1 were used, an equivalent amount of wax could be crystallized from an equivalent amount of oil feed with only 0.75 volume of coolant. By being able to operate with minimum solvent in the crystallization step, apparatus of fixed crystallization capacity could be used to process substantially larger volumes of feed or smaller equipment could be used to process the same volume of feed.

Also, by being able to operate with reduced amounts of solvent in the crystallization step, added advantage can be taken of applicant's unexpected finding that substantial increases in separation capacity can be obtained by adding solvent interstage to a two-staged centrifugation separation process without increasing the overall solvent inventory needed to carry out the dewaxing process.

Applicant found that for a fixed centrifugation capacity, substantial improvements in separation rate could be obtained at no overall increase in solvent to the system by carrying out the crystallization step with minimum or no solvent and adding fresh solvent interstage to the staged separation process.

Applicant's process substantially reduces the size of equipment for equivalent throughput rates, pump, compressor, and refrigeration needs and overall solvent inventory. All of these reductions result in substantial investment and operating cost savings.

The figure of the drawing is a diagrammatic elevational view of an immiscible cooling crystallization apparatus containing a chilling tower for crystallizing crystallizable feed material, a constricted wax-oil slurry withdrawal means, a staged centrifuge separation means, and a means for cooling the immiscible coolant by vaporization of a volatile refrigerant. The drawing also illustrates a novel means for introducing the feed in the form of a dense dispersion of essentially uniform diameter droplets.

The waxy oil feed containing the wax to be crystallized should remain fluid under the conditions of spraying in the tower. The crystallizable wax should be, in most cases, completely dissolved in a feed prior to spraying. In order to prevent the formation of an emulsion or the entrainment of dispersed phase feed droplets in the coolant, there must be a sufficient density difference between the coolant and the feed so that the countercurrency is maintained by gravity flow. The density difference should exist even after the wax in the feed crystallizes so that the crystals in the oil droplets continue to flow countercurrent to the coolant.

The feeds that can be used in accordance with this process will include any hydrocarbon feed in which there is a crystallizable wax which can be separated from the feed by crystallizing the wax on cooling the feed. The process is especially applicable to crystallizing wax from petroleum hydrocarbon fractions, particularly distillate fractions. The distillate fractions generally have a boiling range below 900° F. and contain crystalline waxes. The crystalline wax materials are considered to be high angle of repose materials and heretofore have required high solvent dilution ratios to maintain fluidity of the wax-oil slurry during crystallization. Examples of crystalline feeds are Solvent 100 Neutral having a boiling range of 670–

800° F. and a viscosity of 100 SSU @ 100° F., Solvent 450 Neutral having a boiling range of 800–950° F. and a viscosity of 450 SSU @ 100° F., and Barossa 56 having a boiling range of 820–970° F. and a viscosity of 500 SSU @ 100° F.

In addition to treating distillate feeds to remove crystalline wax material, residual feeds may be treated to remove micro-crystalline wax material. The residual feeds generally boil above 900° F. The residual feeds are considered to contain low angle of repose waxes and, though more viscous, are generally more easily handled in the dewaxing processes. Typical residual hydrocarbon fractions which are treated to remove the wax are Bright Stock boiling in the range of 1050° F.+ and having a V.I. of 95–100, and Cylinder Oil boiling in the range of 1050° F.+ and a V.I. of 85–90.

The coolant used to cool the dispersed phase is substantially immiscible with the feed. The density difference between the coolant and the feed should be sufficient to maintain countercurrency in the column under all conditions of operation. The coolant should be sufficiently fluid at the cooling temperatures used that the dispersed phase feed droplets move easily through the continuous cooling phase.

Suitable coolants for use in hydrocarbon dewaxing are water, aqueous salt solutions, aqueous calcium chloride brine solutions, and the like. The concentration of salt in the water, for example, calcium chloride brine, can be adjusted to obtain the desired density of the coolant and to lower the freezing point of the coolant to the temperature at which the petroleum fraction is to be dewaxed.

Diluents or solvents may be added to the feed from which the wax is to be crystallized in order to improve the viscosity of the feed being treated so that it may be more easily handled and/or to aid in the crystallization and separation of crystals from the feed. Solvents for the feed material can be added to the feed, as well as anti-solvents for the wax to be crystallized to aid in the crystallization. The solvent or diluent used and the amount used will depend on the particular feed being treated. With particular reference to petroleum hydrocarbon dewaxing, solvents such as MEK, MEK/toluene, propane, butane, pentane, and hexane can be used. The solvents materially aid in the centrifugation separation of the crystallized wax from the oil. Solvents, though not required in the crystallization step, are required in the separation step to provide fluidity to allow movement of the crystallized wax through the oil. The ratio of solvent to feed to the crystallization step can be about 0 to about 2.0, about 0 to about 1.5 and preferably about 0 to about 1.0. And the ratio of solvent to the wax-oil slurry feed to the second stage of centrifugation can be about 0.5 to about 4.0, about 0.5 to about 3.0, and preferably about 1.5 to about 2.5. The overall solvent ratio to feed used can be about 1.5 to about 4.0, about 1.5 to about 3.0 and preferably about 1.6 to about 2.5. The overall amount of solvent used will vary with the particular hydrocarbon feed being treated, the feed throughput rate, and the final crystallization temperature, pour point of dewaxed oil and oil content of wax desired.

By operating in accordance with applicant's invention, minimum solvent need be in both the crystallization step and in the staged separation step. Also, the amount of entrained coolant which heretofore had been used to improve fluidity of the collapsed dispersed phase is not needed to assure the flow of the dispersed phase out of the tower. This is advantageous since, under certain operating conditions, excess entrained coolant has an adverse effect on the subsequent separation step.

In dewaxing petroleum hydrocarbon fractions, in a balanced system one volume of coolant can be used to cool about 2–3 volumes of feed, depending on the coolant, the feed, the amount of solvent used, and the desired final crystallization temperature. If the heat exchange between the coolant and feed were perfect and optimum volume holdup of dispersed phase were used, the outlet temperature of the oil would approximate the inlet temperature of the coolant and the outlet temperature of the coolant would approximate the inlet temperature of the oil. Adjustment would have to be made, however, for the heat of crystallization which would make the approaches somewhat less than identical.

The feed to be crystallized can be introduced into the tower at a rate of 15–400 cu. ft./sq. ft. of column cross section per hour. Rates of 35–150 cu. ft./sq. ft./hour are preferred; however, rates of 25–325 cu. ft./sq. ft./hour can also be used. The relative rate at which the feed and coolant are fed to the tower will depend on the feed temperature, the coolant temperature, the final crystallization temperature desired, the effective height of the tower, and the volume holdup. Feed and coolant are introduced into the tower at a sufficient rate to provide the desired chill rate and desired temperature gradient between the coolant and the dispersed feed phase. Coolant is introduced to the tower at a rate of about 5–200 cu. ft./sq. ft. of column cross section per hour, through rates of 10–100 cu. ft./sq. ft. are preferred; however, rates of 10–150 cu. ft./sq. ft./hour can also be used.

After filling the column with the coolant, the feed containing a crystallizable wax material is introduced into the column through a spray inlet means which produces essentially uniform size droplets. Though it is preferred to operate with very narrow drop size distribution, efficient operations have been carried out where the drop size has varied between 10–30% from the average drop size diameter and efficient heat exchange was still obtained. However, for better results, this variation from the average size is preferred to be kept down to 10–20%. The size of the orifice holes of the spray head through which the feed is introduced is selected to produce the desired droplet size for the particular feed being treated. Orifice holes can be selected to produce drop sizes of $3/8$ to $1/32''$ in diameter, more generally $3/8$ to $1/20''$ in diameter, and preferably about $1/4$ to $1/24''$ in diameter. A sufficient number of orifices is provided in the spray head used to produce a sufficient amount of the drops of the desired size to obtain the desired feed throughput and volume holdup.

The major factor controlling the chill rate is the rise velocity of the droplets in the continuous phase. The rise velocity can be more directly controlled by controlling the volume holdup of dispersed phase droplets in the cooling tower. The volume holdup is determined by the rate of introduction of the dispersed phase feed and/or the relative rate of removal of the dispersed phase from the top of the column. By withdrawing the dispersed phase more slowly than it is introduced, the tower will gradually fill with dispersed phase. High volume holdup provides slower chill rates, higher throughput, and generally more efficient heat transfer in the column. The volume holdup can be as low as 10% up to about 85%. Volume holdup of 15% up to less than 50% can be used. Preferably, the holdup is controlled between 35 and 60% because it is within this range that more efficient heat exchange is obtained. Volume holdup of 50 to 80%, as well as 65 to 77%, can also be used, depending on the feed being treated.

The tower can be operated under conditions to produce chill rates between less than 1° per minute up to chill rates of 150° F. per minute and still obtain easily separable precipitated or crystalline materials. Depending on the feed, chill rates of more than 15° F./min., up to 150° F./min., can be used. Chill rates of 0.25 to 15° F. per minute, or ½ to 7° F. per minute and of 1–3° F. per minute can also be used. Preferably, the tower is operated in such a manner as to obtain chill rates of 30 to 100° F. per minute. The best chill rate to be used with a particular feed and coolant to obtain the best results will depend on the feed and coolant used.

The best temperature gradient for good crystal growth between the dispersed droplet in which the crystal is forming and the continuous coolant phase will also vary with the particular hydrocarbon feed being dewaxed. It is found that a temperature difference of greater than 40° F. results in the formation of wax crystals which are difficult to separate from the mother liquor. However, this maximum upper limit of 40° F. would depend upon the particular hydrocarbon feed being dewaxed. With some feeds it may be a little lower, with others a little higher, and would vary somewhat with the amount of solvent or crystal modifiers used with the feed. A temperature gradient corresponding to a temperature difference of 0.5 to 30° F., more generailly of 0.5 to 20° F., and preferably from 1–10° F. can be used. An efficient operation can be carried out by maintaining the maximum temperature difference between the continuous coolant phase and the dispersed phase at less than 10° F. up to 30° F.

The tower will be operated in such a manner as to obtain close temperature approaches at the top and bottom of the column to insure efficient heat exchange and economy of operation. The temperature approach at the top of the column will be within the range of about 1–40° F., generally within the range of 1–30° F., and more generally of 1–10° F. A temperature approach at the top of 1–20° F. can also be used. In a balance system, the temperature approach at the bottom of the column will also be in the range of 1–40° F., generally 1–30° F., and more generally 5–20° F. The temperature approach at the bottom can also be 1–10° F.

In introducing the continuous phase coolant to the countercurrent contacting tower, it is desirable that the coolant introduction be made in the continuous coolant phase below the point at which the dispersed phase collapses and coalesces in the top of the tower.

The pressure at which the chilling operation is carried out will depend upon the particular feed being treated and a particular coolant being used. With volatile coolants, diluents, or feeds, the tower will be operated at higher pressures, e.g., up to 500 p.s.i.g. The tower, however, generally be operated at positive pressures of 5–350 p.s.i.g. It is the positive pressure of the tower which controls the removal rate of the callapsed dispersed phase at a sufficient rate to allow the operation of the tower at or near its maximum crystallization capacity. More generally, when using non-volatile solvents, the tower will be operated at pressures of 15–150 p.s.i.g.

Crystals, crystal aggregates, or precipitate aggregates formed in the dispersed phase droplet from the chilling step are sufficiently large and sufficiently free of entrained mother liquor to obtain the desired separation of crystallizable material from mother liquor in the subsequent separation step.

Equipment used in accordance with the present invention, including the construction of the tower and the gradual constricted, compressed dispersed phase withdrawal means are simple, easy to operate, and inexpensive. A suitable tower or column containing no internal baffling and containing no expanded section at the top or bottom is used.

The chilling tower is operated at positive pressure and the crystallized material-mother liquor slurry is forced out of the top of the tower by the positive pressure of the tower. The crystallized material-mother liquor withdrawal means is provided with a gradual contraction of the tower which squeezes out coolant to a point where essentially continuous crystallized material plug is formed. The re-constriction at the top of the tower is gradual and is reduced to the size of the removal line going to the separation means.

The centrifuges used in accordance with the illustrated staged centrifugation separation process can be any of the conventional type centrifuges which can be operated to separate wax from oil. However, substantially better throughput rates, lower oil pour points, and lower oil content in separated wax are obtained when using the centrifuges described in applicant's copending application S.N. 156,758, filed Dec. 4, 1961.

The invention may be better understood with reference to the figure of the drawing which is described with reference to dewaxing a petroleum hydrocarbon feed. In order to obtain a desired degree of crystallization from a particular feed, the specific heat of the feed as well as of the coolant is calculated and the ratio of each required to carry out the desired chilling operation is determined. The desired pour point of the dewaxed oil will determine the minimum temperature required in the chilling tower. The coolant will be cooled to a temperature slightly below this temperature to obtain the desired amount of crystallization of the feed and pour of dewaxed oil. The feed will be generally introduced at about ambient temperature and the difference between the feed input temperature and the minium chilling temperature of the crystallization step will constitute the chilling range.

In a preferred embodiment of the present invention, a continuous phase coolant consisting of about a 28% calcium chloride brine solution is introduced into the top of the tower 2 through upward pointing orifice openings 17 on circular ring 12. The coolant is introduced through line 4 initially at about ambient temperature and is fed into the tower until the tower is completely filled with coolant. After the tower is filled with coolant, the petroleum hydrocarbon fraction containing 3 to 30 wt. percent wax, based on feed, is introduced into the tower at about ambient temperature through line 1 and through spray hear orifice plate 3 containing protruding orifices 38. The spray head is surrounded by annular vertical baffle 41.

The feed is diluted with a ratio of solvent to feed of about 0.1 to 0.9 and introduced into the tower at a temperature above its pour point, for example, 40 to 160° F. The annular baffle 41 is placed at the outer edge of spray head plate 3 and extends vertically upward from the outer edge of plate 3 for a distance of about ⅛ the spray head plate diameter. The baffle 41 deflects the standing vortex 5 of the continuous cooling phase outward and away from the vicinity of the spray head. As the dispersed phase is introduced into the tower, it displaces continuous coolant phase which is removed through the wax slurry outlet line 24. When the desired rate of introduction of the dispersed phase is reached, the amount of coolant removed from outlet 24 reverts to the difference between the coolant inlet rate through line 4 and the outlet through line 7. Initially, during startup, the exit of large excess amounts of coolant through line 24 is caused by the introduction of the feed liquid into the tower since room must be made for this liquid. Once countercurrency is established in the tower, the inlet temperature of the coolant is gradually reduced until the desired dewaxing temperature is reached. The wax in the feed is crystallized and the dispersed droplets concentrate in the top of the column and a sharp concentration gradient 19 is established between dispersed phase in continuous phase coolant and collapsed dispersed phase containing only a minor amount of entrained coolant. Excess coolant over that withdrawn through coolant outlet line 7 is introduced through line 4 to compensate for coolant entrained in the wax-oil slurry leaving with wax-oil slurry through slurry outlet line 24.

The coolant can be introduced suitably at a temperature of −45° F. to +40° F., depending upon the particular feed being treated. Temperature approaches at both ends are within about 1 to 30° F. and sufficient dispersed phase is introduced to obtain a volume holdup of dispersed phase of about 30 to 60 vol. percent. Under these conditions, efficient heat exchange between coolant and dispersed phase is obtained.

The waxy oil feed introduced through spray plate 3 forms a dense dispersion of essentially uniform diameter droplets 6 of ⅜ to 1/20″ in diameter, which rise at a rate in the column of about 2 to 50 ft./min. The feed is introduced into the column at a rate of about 25 to 250 cu. ft./ sq. ft. of column cross section. The coolant is introduced at a ratio of about 1 part coolant to 2 to 2½ parts of petroleum fraction feed or about 10 to 150 cu. ft./sq. ft. of column cross section per hour. The continuous coolant phase countercurrently contacts the rising dense dispersion of oil droplets cooling them at a controlled rate of 30 to 80° F./min. while maintaining the temperature difference between the dispersed phase droplet and the coolant phase of between 1 and 30° F. As the oil droplets are cooled from their inlet temperature to the exit temperature in the top of the column, the wax present in the spray droplets crystallizes out of solution.

The upward movement of the dense dispersion of essentially uniform size waxy oil droplets is indicated by the open arrows while the downward countercurrent flow of the continuous coolant phase is indicated by the closed arrows. At the top of the tower the dispersed phase compresses and forms an essentially continuous collapsed phase of less dense material extending upward from the sharp concentration gradient 19 near the top of the tower to the top of the tower. As the inventory of the less dense material wax-oil coolant slurry builds up in column 2 it is collapsed and compressed in the constricted areas 21 and 23 at the top of column 2. In the drawing the collapsed, dispersed phase of the less dense material, that is, the wax-oil coolant slurry, is indicated by 10 and 10A.

Generally, the tower is operated in such a manner and the withdrawal rate of the slurry is controlled in such a manner that 1 to 20 vol. percent of occluded coolant is withdrawn with the crystallized wax and liquid oil. In the event that additional coolant is not added to make up for that withdrawn with the slurry, the sharp concentration gradient 19 between coolant and dispersed phase will gradually move down the column and the tower will upset and become inoperative. It was found that by using applicant's novel take-off means, even with a minimum or no solvent in the feed and with suspensions of solids which were below their pour point, the crystallized material could be removed from the top of the tower and through line 24 without plugging the tower or removal means and/or stopping the operation of the tower.

The wax-oil slurry 10A is removed from crystallization tower 2 through line 24. This slurry may be further cooled to its final crystallization temperature by adding cold recycle solvent from line 35. The recycle solvent in line 35 can be cooled to a temperature beow the inlet temperature of the immiscible coolant by conventional cooling means, not shown.

The recycle solvent contains some oil recovered from the second stage centrifugation. The recycle solvent is mixed with the wax-oil slurry at about the final desired crystallization temperature and fed to centrifuge A which carries out the first stage of the separation. The first stage is essentially a dewaxing step wherein all of the wax is separated from the wax-oil slurry. The overflow stream from this stage is taken through line 31 and contains low pour point dewaxed oil and substantial amounts of solvent. This stream is fed to solvent stripper 32 wherein dewaxed oil free of solvent is removed through line 33 and solvent free of oil recovered overhead through line 39. This solvent is referred to as fresh solvent. The solvent is cooled in heat exchanger 37 by cooling means 38. The cooled solvent is compressed by compressor 40 and liquefied (in the case of propane) and taken into line 41. Make-up solvent could be added at this point. The solvent stream is divided by valve 42 and a ratio of solvent to feed of 0.1 to 0.5, preferably less than 0.5 is sent via line 43 to be mixed with the feed to the crystallization step. A ratio of solvent to feed of 1.0 to 1.9, preferably less than 2.0 is sent via line 41 to be mixed with the underflow stream from centrifuge A containing primarily wax and a large amount of oil and fed to centrifuge B. The over-all solvent ratio to feed is less than 2.5 and preferably 1.5 to 2.0.

In centrifuge B primarily a deoiling of the wax-oil feed takes place and a low oil content wax is recovered. The underflow stream 36 from centrifuge B contains wax substantially free of oil. The wax does contain some solvent which is subsequently stripped from the wax and recycled to the process. The overflow stream 35 contains a minor amount of recovered carryover oil from the separation that took place in centrifuge A and a substantial amount of solvent.

Substantially all of the solvent feed to centrifuge B is cycled to centrifuge A.

The warm coolant is removed from the bottom of column 2 through line 7 and can be cooled by conventional means, such as by direct contact with a vaporizing auto-refrigerant or by indirect heat exchange. In accordance with one embodiment of the present invention, the coolant is removed through line 7 and is continuously fed to direct contact cooling vessel 9 via pump 31. In vessel 9 it is directly contacted with a cold liquid auto-refrigerant under pressure, such as propane, at a temperature of about −44° F. and at a pressure of about 0 p.s.i.g. The coolant and liquid auto-refrigerant are intimately mixed and the propane allowed to slowly vaporize at a controlled rate and the vapor is removed through line 14. Vaporization of the liquefied propane provides refrigeration, cooling the warm coolant from a temperature of about 65° F. to a temperature of about −35° F. Cold liquid coolant is removed through line 15 via pump 16 and is introduced into chilling column 2 through line 4.

The constricted areas 21 and 23 of tower 2 in FIGURE 1 of the drawings provide the necessary gradual constriction to reduce the area of the tower from the tower diameter to the diameter of the withdrawal line 24. This constriction must be gradual or bridging of crystallized wax and excess entrainment of coolant will occur. For example, the angle of the cone of area 21 can be between 10 and 60°, and the angle of cone 23 can generally be between 5 and 60°. In this manner, the diameter of the withdrawal means is reduced to about 5–25% of the effective diameter of the tower.

Impeller 19 attached to shaft 26 aids in collapsing and compressing dispersed phase droplets 6 in the top of the tower. The inverted cone 21 and conical means 23 further compress the dispersed phase to form a plug of compressed dispersed phase 10 and 10A, forming a pressure seal in the top of the tower and allowing the positive pressure in the tower to act on this material to force it out of the tower. The tower in this embodiment is operated at a positive pressure of 15–350 p.s.i.g., thereby providing the driving force for pushing out the crystallized product from the tower. This seal allows the positive pressure of the tower to work on the compressed dispersed phase forcing it out of the tower via outlets 22 and 24.

In order not to overly complicate the drawing, various pumps, valves, and heat exchangers have been omitted from the drawing.

Obvious conventional expedients to obtain maximum heat exchange advantage from the various process streams, as well as to maximize the recovery of solvent, are extended to be included in this description.

The invention may be better understood with reference to the following examples.

*Example 1*

In this example a Bright Stock micro-crystalline feed is dewaxed. The wax and the feed are crystallized in a countercurrent, direct contact chilling tower as above described. The wax-oil slurry recovered is fed to a two-tage centrifugation separation process to recover dewaxed oil and deoiled wax. Two 25-inch nominal diameter centrifuges are operated in series at about 4300 r.p.m.

The cenrifugets are operated to give a dewaxed oil yield of about 72%, having a pour point of 15° F. at a constant feed slurry capacity of 100 g.p.m. The second centrifuge is operated to give a deoiled wax at a constant oil content of 20% SBA at 0° F. The separation temperature is −35° F. The underflow stream from the second centrifuge contains a maximum of 22.5% solids under these conditions.

Applicant unexpectedly found that for constant oil yield and oil and wax quality, the more of the solvent, in this case propane, added interstage to the centrifugation step, the less was the amount of overall solvent required to carry out the dewaxing process. The information present below in Table I illustrates applican't findings.

TABLE I
[Feed, Bright Stock, Solvent, Propane]

| Ratio of Solvent to Feed to Crystallization Tower | Ratio of Solvent to Total Feed Added Interstage | Total Solvent Required to Carry Out Dewaxing | Centrifuge Separation Capacity, g.p.m. |
|---|---|---|---|
| 0 | 1.6 | 1.6 | 100 |
| 0.75 | 1.25 | 2.0 | 100 |
| 1.0 | 1.1 | 2.1 | 100 |
| 1.5 | 0.8 | 2.3 | 100 |
| 1.75 | 0.75 | 2.5 | 100 |
| 2.0 | 0.6 | 2.6 | 100 |
| 2.5 | 0.5 | 3.0 | 100 |

The above table clearly shows that a substantial reduction in overall solvent required to carry out the dewaxing operation can be achieved by adding all of or the major part of the solvent used to the second stage centrifugation separation step. For example, a 33% reduction in solvent required can be achieved by adding 1.25 parts of solvent interstage and 0.75 part to the tower as compared with adding 0.5 part solvent interstage and 2.5 parts to the tower. Where the feed is sufficiently fluid, as with Bright Stock, to be efficiently sprayed without the addition of solvent to the feed to the tower, the overall solvent required can be further reduced to 1.6. This overall reduction is obtained by adding all of the solvent to the second stage of the separation step and no solvent is added to the tower.

Minimizing the amount of solvent required to carry out the dewaxing step substantially reduces the cost of the apparatus required, the cost of the solvent and the operating costs. Also, refrigeration costs for the crystallization step are substantially reduced by not having to cool in the tower a large volume of solvent to the wax crystallization temperature.

*Example 2*

In order to illustrate the effect on separation capacity of adding the dilution solvent interstage, a constant overall solvent dilution of 2.5 of propane is used and the amount added interstage varied. The centrifuges are operated in the same manner as described in Example 1 to give a 72% oil yield of 15° F. pour point and a wax of 20% oil content SBA at 0° F. In this example, the maximum percentage solids underflow from the second centrifuge is 22.5% solids. The effect of adding solvent interstage as compared with adding solvent to the tower is shown below in Table II.

TABLE II
[Feed, Bright Stock; Solvent, Propane]

| Ratio of Solvent to Feed to Crystallization Tower | Ratio of Solvent to Total Feed Interstage | Total Solvent in System | Centrifuge Separation Capacity, g.p.m. |
|---|---|---|---|
| 2.5 | 0 | 2.5 | 0 |
| 2.25 | 0.25 | 2.5 | 0 |
| 2.0 | 0.5 | 2.5 | 0 |
| 1.75 | 0.75 | 2.5 | 110 |
| 1.5 | 1.0 | 2.5 | 110 |
| 1.25 | 1.25 | 2.5 | 100 |
| 1.0 | 1.50 | 2.5 | 110 |
| 0.75 | 1.75 | 2.5 | 120 |
| 0.5 | 2.0 | 2.5 | 125 |
| 0.25 | 2.25 | 2.5 | 200 |

This example clearly shows the unexpected increase in separation and dewaxing capacity obtained by adding the dilution solvent interstage to the separation step. Using the same overall solvent dilution ratio, at constant oil yield and oil and wax quality, the dewaxing capacity goes from inoperative where all the solvent is added to the tower to a separation capacity of 200 g.p.m. where 2.25 volumes of solvent are added interstage and 0.25 volume of solvent are added to the tower. Where half the available solvent, i.e., 1.25 volumes, is added to the tower and the other half, i.e., 1.25 volumes, added interstage, a separation capacity of 100 g.p.m. is obtained.

The above examples clearly illustrate that it is not only the total amount of solvent added in the system that is important to the centrifugation separation capacity as it is where in the process it is added. The examples clearly illustrate applicant's unexpected finding that the overall solvent requirements can be substantially reduced by adding the solvent interstage.

The overall refrigeration requirements can be reduced by minimizing the amount of solvent added to the feed to the crystallization step. For a specified pour point oil product, the refrigeration required to carry out the crystallization step can be further reduced by attaining the final crystallization temperature by cooling the wax-oil slurry recovered from the tower by directly mixing the slurry with solvent cycled from stage two of the centrifugation which has been cooled about 40° F. below the temperature of the wax-oil slurry. Preferably, the recycle solvent is cooled about 10–30° F. below the temperature of the wax-oil slurry and is mixed with the wax-oil slurry to reduce the slurry to its final desired crystallization temperature. In this manner, a −35° F. wax-oil slurry could be further cooled to −40° F. by mixing with −44° F. recycle solvent. The −44° F. temperature could be obtained by directly or indirectly cooling this stream by contact with vaporizing refrigerant.

The solvents that can be used in applicant's process are the conventional dewaxing solvents, e.g., light hydrocarbons $C_2$ to $C_8$, methyl ethyl ketone, toluene, methyl isopropyl ketone, methyl isobutyl ketone, and the like, and mixtures thereof. Overall solvent dilution ratios of less than 2.5 and preferably less than 2.0 can be used. The amount of solvent added to the crystallization tower can be preferably 0 to 0.5. Generally, minimum solvent consistent with sufficient fluidity to obtain an efficient spray of the feed in the crystallization tower will be used.

This invention can be used to separate wax from all waxy oil feeds. The critical feature of this invention is adding the major portion of the dilution solvent required interstage to the centrifugation separation step and being able to minimize the amount of solvent used to carry out the crystallization step.

The invention is not to be restricted to the examples but only by the scope of the appended claims.

What is claimed is:

1. A process for dewaxing a waxy oil hydrocarbon fraction requiring minimum added solvent comprising countercurrently contacting said fraction with an immisible coolant, said coolant being introduced at a temperature below the crystallization temperature of the feed to one end of a chilling tower to which is introduced at the other end the waxy hydrocarbon feed and 0 to about 1.0 volume of solvent at a temperature above the crystallization temperature of the feed, said feed being introduced as a relatively dense dispersion of essentially uniform diameter droplets, which droplets rise in the tower and gradually cool to the crystallization temperature of the wax in the dispersed droplets, said tower being operated under positive pressure, said dispersed phase containing said crystallized wax and dewaxed oil is collapsed and gradually compressed to form a continuous zone of wax-oil slurry consisting essentially of crystallized wax and oil forming a pressure seal against which the positive pressure in the tower acts to push said compressed material out of said tower, separating said wax-oil slurry from said immiscible coolant, said wax-oil slurry being fed to a first-stage centrifuge wherein substantially all of the wax in the wax-oil slurry is removed in the underflow stream and the overflow stream consisting essentially of solvent and dewaxed oil is recovered, said underflow stream comprising wax and oil being mixed at a ratio of solvent to wax-oil slurry of about 1.5 to 2.5 and being fed to a second stage centrifuge, said centrifuge being operated to substantially remove all the oil and solvent from said wax, recovering from said second stage an underflow wax stream containing wax and solvent and substantially free of oil and recovering an overflow stream containing solvent and a minor amount of oil, recycling said overflow stream to said first stage centrifuge and mixing it with said wax-oil slurry from said crystallization step.

2. The process of claim 1 wherein the pour point of the dewaxed oil product is reduced by cooling said recycle stream solvent to said first stage of centrifugation to a temperature substantially below the final crystallization temperature of the waxy-oil slurry in said crystallization tower prior to mixing said solvent with the slurry from the tower.

3. The process of claim 1 wherein the overall solvent to feed ratio in the dewaxing process is about 1.5 to 2.5.

4. The process of claim 3 wherein the solvent is propane and the ratio of solvent to feed to the crystallization tower is less than 0.5.

5. The process of claim 1 wherein the solvent is selected from the group consisting of methyl ethyl ketone, methyl isobutyl ketone, methyl isopropyl ketone, methyl ethyl propyl ketone, methyl ethyl butyl ketone, toluene, light hydrocarbon consisting of $C_3$ to $C_8$, and mixtures thereof.

6. The process of claim 1 wherein the hydrocarbon feed comprises a crystalline wax feed boiling below about 900° F.

7. The process of claim 1 wherein the hydrocarbon feed comprises a micro-crystalline wax feed boiling above about 900° F.

References Cited
UNITED STATES PATENTS

| | | | |
|---|---|---|---|
| 271,080 | 1/1883 | Kells | 208—37 |
| 2,005,988 | 1/1935 | Brown | 208—37 |
| 2,301,965 | 11/1942 | Mauro et al. | 208—30 |
| 2,463,845 | 3/1949 | Backlund et al. | 208—33 |
| 3,067,125 | 12/1962 | Kemp | 208—37 |
| 3,083,154 | 3/1963 | Gersic et al. | 208—38 |
| 3,178,899 | 4/1965 | Torobin et al. | 62—58 |

FOREIGN PATENTS 353,392   7/1931   Great Britain.

OTHER REFERENCES

Petroleum Refiner, Wax Fractionation, September 1960, page 245.

DANIEL E. WYMAN, *Primary Examiner.*

P. E. KONOPKA, *Assistant Examiner.*